(12) United States Patent
Callanan et al.

(10) Patent No.: US 10,755,236 B2
(45) Date of Patent: Aug. 25, 2020

(54) DEVICE-INDEPENDENT ATTENDANCE PROMPTING TOOL FOR ELECTRONICALLY-SCHEDULED EVENTS

(71) Applicant: INTERNATIONAL BUSINESS MACHINES CORPORATION, Armonk, NY (US)

(72) Inventors: Sean Callanan, Dublin (IE); Ruthie D. Lyle, Durham, NC (US); Patrick J. O'Sullivan, Dublin (IE); Fred Raguillat, Dunboyne (IE); Carol S. Zimmet, Boxborough, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 948 days.

(21) Appl. No.: 14/249,144

(22) Filed: Apr. 9, 2014

(65) Prior Publication Data
US 2014/0222484 A1    Aug. 7, 2014

Related U.S. Application Data

(63) Continuation of application No. 12/953,707, filed on Nov. 24, 2010, now abandoned.

(51) Int. Cl.
*G06Q 10/10* (2012.01)
*G06Q 10/06* (2012.01)
*H04M 3/56* (2006.01)

(52) U.S. Cl.
CPC ... *G06Q 10/1095* (2013.01); *G06Q 10/06314* (2013.01); *G06Q 10/063114* (2013.01); *H04M 3/565* (2013.01)

(58) Field of Classification Search
CPC ......... G06Q 10/0631; G06Q 10/06314; G06Q 10/063114; G06Q 10/109; G06Q 10/1095; G06Q 10/107; H04M 3/56; H04M 3/565
See application file for complete search history.

(56) References Cited

U.S. PATENT DOCUMENTS 5,812,865 A * 9/1998 Theimer .................. G06F 9/547
                                                                 379/88.13
6,173,153 B1 * 1/2001 Bittman .................. G07C 11/00
                                                                 434/109

(Continued)

FOREIGN PATENT DOCUMENTS

WO    2007148005 A1    12/2007

OTHER PUBLICATIONS

WinSent Lab. "WinSent Messenger—instant messenger for LAN." Retrieved from <www.winsentmessenger.com>.

*Primary Examiner* — Jonathan G Sterrett
*Assistant Examiner* — Stephen S Swartz
(74) *Attorney, Agent, or Firm* — Cuenot, Forsythe & Kim, LLC

(57) ABSTRACT

In one embodiment, a system for motivating electronically-scheduled event attendance can include a set of attendance listening components, an attendance prompt, and an attendance prompting tool. The attendance listening components can monitor activities performed in a networked environment. The attendance prompt can represent an electronic message and feedback mechanism that is provided on an electronic device. The attendance prompting tool can interject the attendance prompt into an activity identified by an attendance listening component as being performed by a user-selected member of the networked environment. The (Continued)

attendance prompt can be associated with an electronically-scheduled event the user-selected member is to attend.

24 Claims, 4 Drawing Sheets

(56) References Cited

U.S. PATENT DOCUMENTS

| | | | |
|---|---|---|---|
| 6,688,891 B1* | 2/2004 | Sanford | G09B 7/00 434/307 R |
| 6,732,103 B1 | 5/2004 | Strick et al. | |
| 7,739,210 B2 | 6/2010 | Horvitz et al. | |
| 7,831,679 B2* | 11/2010 | Apacible | H04W 40/02 340/4.3 |
| 8,527,287 B1* | 9/2013 | Bhatia | G06Q 10/109 705/1.1 |
| 8,788,308 B1* | 7/2014 | Cox | G06Q 10/063116 705/7.13 |
| 8,887,069 B2* | 11/2014 | Tipirneni | G06F 3/011 709/204 |
| 8,898,231 B2* | 11/2014 | Crawford | G06Q 10/02 705/7.19 |
| 2002/0085030 A1* | 7/2002 | Ghani | G06Q 10/10 715/751 |
| 2003/0061231 A1* | 3/2003 | Lovegren | G06Q 10/10 |
| 2004/0110119 A1* | 6/2004 | Riconda | G09B 7/02 434/350 |
| 2005/0034079 A1* | 2/2005 | Gunasekar | G06Q 10/1095 715/753 |
| 2006/0057550 A1* | 3/2006 | Sahashi | G06F 21/32 434/350 |
| 2007/0100986 A1* | 5/2007 | Bagley | G06Q 10/10 709/224 |
| 2007/0162315 A1* | 7/2007 | Hodges | G06Q 10/02 705/7.12 |
| 2007/0188902 A1* | 8/2007 | Patron | G11B 27/11 360/31 |
| 2007/0229652 A1 | 10/2007 | Center et al. | |
| 2007/0244969 A1 | 10/2007 | Knight et al. | |
| 2008/0195312 A1* | 8/2008 | Aaron | G06Q 10/109 455/418 |
| 2009/0094088 A1 | 4/2009 | Chen et al. | |
| 2009/0148827 A1* | 6/2009 | Argott | G09B 7/02 434/433 |
| 2009/0323916 A1* | 12/2009 | O'Sullivan | H04M 3/565 379/202.01 |
| 2010/0005142 A1* | 1/2010 | Xiao | G06Q 10/10 709/204 |
| 2010/0070861 A1* | 3/2010 | Meier | G09B 7/00 715/716 |
| 2010/0121665 A1 | 5/2010 | Boyer | |
| 2010/0153160 A1* | 6/2010 | Bezemer | G06Q 10/06 705/7.12 |
| 2011/0093340 A1* | 4/2011 | Kramer | G06Q 30/02 705/14.58 |
| 2011/0102142 A1* | 5/2011 | Widger | G09B 5/06 340/5.83 |
| 2013/0191763 A1* | 7/2013 | Jones | H04L 67/36 715/753 |

* cited by examiner

DEVICE-INDEPENDENT ATTENDANCE PROMPTING TOOL FOR ELECTRONICALLY-SCHEDULED EVENTS

CROSS REFERENCE TO RELATED APPLICATIONS

This application is a continuation of U.S. patent application Ser. No. 12/953,707 entitled "A DEVICE-INDEPENDENT ATTENDANCE PROMPTING TOOL FOR ELECTRONICALLY-SCHEDULED EVENTS", filed on 24 Nov. 2010 (pending), which is incorporated herein in its entirety.

BACKGROUND

The present invention relates to the field of electronically-scheduled events and, more particularly, to a device-independent attendance prompting tool for electronically-scheduled events.

Software systems allowing electronic scheduling of various types of events (e.g., meetings, collaboration sessions, teleconferences, etc.) have improved the scheduling process by increasing the visibility of schedules and calendars. Electronic scheduling systems can include a reminder function that sends the attendee messages to remind him or her of the upcoming event. Some electronic scheduling systems broadcast the reminder, not only within the electronic scheduling system, but also to alternate forms of communication like text messages and phone calls.

BRIEF SUMMARY

One aspect of the disclosure can include a method, a computer program product, a system, and an apparatus for motivating electronically-scheduled event attendance. In the aspect, a command by an attendance prompting tool can be received. The command can be to issue an attendance prompt to at least one attendee of an electronically-scheduled event, where the at least one attendee is denoted as being absent from the electronically-scheduled event. An existence of at least one activity being performed by the at least one attendee with at least one electronic device can be ascertained. If at least one activity exists, an attendance prompt can be generated for the electronically-scheduled event. The attendance prompt include at least a reminder message for the electronically-scheduled event and an attendance update mechanism for the at least one attendee to provide a response to the attendance prompt. The attendance prompt can be compatible with the at least one electronic device. The generated attendance prompt can be interjected into the at least one activity. That is, contents of the attendance prompt can be presented to the at least one attendee operating the at least one electronic device. In response to receiving the response from the attendance prompt, attendance information presented within a graphical user interface (GUI) of the attendance prompting tool can be updated.

Another aspect of the disclosure can include a system for motivating electronically-scheduled event attendance. The system can include a set of attendance listening components, an attendance prompt, and an attendance prompting tool. The attendance listening components can monitor activities performed in a networked environment. The attendance prompt can represent an electronic message and feedback mechanism that is provided on an electronic device. The attendance prompting tool can interject the attendance prompt into an activity identified by an attendance listening component as being performed by a user-selected member of the networked environment. The attendance prompt can be associated with an electronically-scheduled event the user-selected member is to attend.

DETAILED DESCRIPTION

Figure 1:
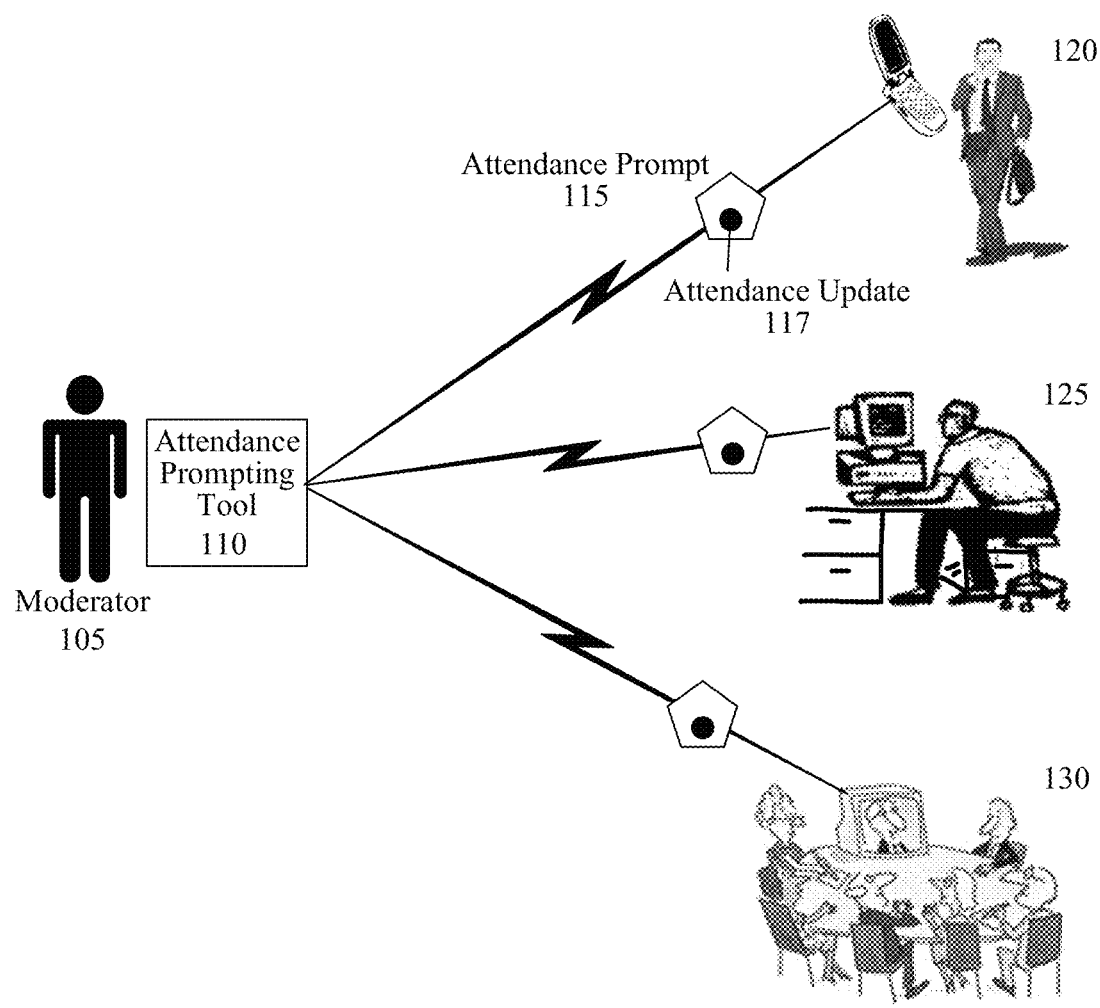
FIG. 1 is a conceptual illustration of the basic function of a device-independent attendance prompting tool in accordance with embodiments of the inventive arrangements disclosed herein.

The present invention discloses a solution for motivating absent attendees to attend an electronically-scheduled event using an attendance prompting tool. The attendance prompting tool can determine one or more activities being performed by the absent attendee. An activity can then be interrupted and an attendance prompt can be presented upon the electronic device being used for the activity. In addition to a reminder message, the attendance prompt can also include a feedback mechanism by which the absent attendee can provide a response regarding their attendance of the event.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a conceptual illustration 100 of the basic function of a device-independent attendance prompting tool 110 in accordance with embodiments of the inventive arrangements disclosed herein. The overall concept shown in illustration 100 can be the capability for directly contacting and receiving attendance feedback from event attendees 120, 125, and 130 absent from the scheduled event.

In illustration 100, the moderator 105 of an electronically-scheduled event can be waiting to conduct a meeting in a conference room. The moderator 105 could have scheduled this event electronically via an enterprise calendar system and invited various employees to attend. Preparing to start the meeting, the moderator 105 can notice that attendees 120, 125, and 130, who confirmed their invitation to the meeting, are not yet in attendance.

While the absence of some confirmed attendees 120, 125, and/or 130 from a meeting is not unusual in large organizations, there can be occasions where the missing attendees 120, 125, and 130 are vital to or are the reason for the event. Let us assume that moderator 105 requires attendees 120, 125, and 130 to conduct the meeting.

Attendee 120 can be on his way back into the office, talking on his cell phone. Attendee 125 can be at his desk engrossed in his work, simply having lost track of the time. Attendee 130 can be in a video conference that has overrun its scheduled ending time.

Conventionally, the moderator 105 would attempt to manually contact each absent attendee 120, 125, and 130, asking each for an update as to whether they will be able to attend the meeting. This process can be time-consuming as the moderator 105 must be able to look-up contact and/or calendar information for each attendee 120, 125, and 130 and possibly make multiple attempts at contact. Such a task can be particularly frustrating if the moderator 105 does not have the proper privileges to view the calendars of the absent attendees 120, 125, and 130.

The attendance prompting tool 110 can reduce the amount of time and frustration the moderator 105 experiences in response to performing such a task. The attendance prompting tool 110 can be a software application that automatically contacts attendees 120, 125, and 130 determined to be or marked as absent from an event.

The attendance prompting tool 110 can send an attendance prompt 115 to the absent event attendees 120, 125, and 130. The attendance prompting tool 110 can present the attendance prompt 115 to event attendees 120, 125, and 130 as they perform other tasks, even if using other types of devices.

Using the examples of illustration 100, the phone conversion being conducted by attendee 125 can be interrupted to audibly play the attendance prompt 115. Attendee 130 can receive a message window presented directly in his display, regardless of what software applications are being used. The attendance prompt 115 can be interjected into or overlaid upon the teleconference visual being presented to attendee 130.

Unlike the reminder functionality of most conventional electronic scheduling systems, the attendance prompt 115 can include an attendance update 117 mechanism. The attendance update 117 can represent an immediate means for the attendee 120, 125, and/or 130 to provide the moderator 105 with a response to the attendance prompt 115.

For example, since the attendance prompt 115 sent to attendee 125 is an audible message, the attendance update 117 can be in the form of a phone tree in which attendee 125 can select a key on the number pad that corresponds to the response they wish to send back to the moderator 105.

In one embodiment, the attendance prompt 115 can actively seek to detect an ongoing communication or interaction involving an attendee 120, 125, 130 and an accessible communication device. This device can be selected for the prompting, even if other devices of the attendee 120-130 are registered for that attendee. Thus, instead of looking for a "non-busy" mechanism for contacting an attendee 120-130, the disclosure can provide a barge-in capability for an active device, using the assumption that an attendee 120-130 is paying attention to the active device and will therefore see the attendance prompt 115. Additionally, in one embodiment, additional information, such as current or scheduled location of an attendee (e.g., attendee 130) can be used to select a device for presenting the attendance prompt 115 (e.g., the teleconference barge-in, for example). In one embodiment, the attendance prompting tool 110 can include numerous rules and/or priorities, which are used to determine whether it is appropriate to barge-in an existing communication or not. For example, the rules and/or priorities, which can be user configurable, can be based on relative importance of the meeting for which the prompt 115 is being provided versus a relative importance of a meeting or communication being "interrupted" via a barge-in prompting.

Figure 2:
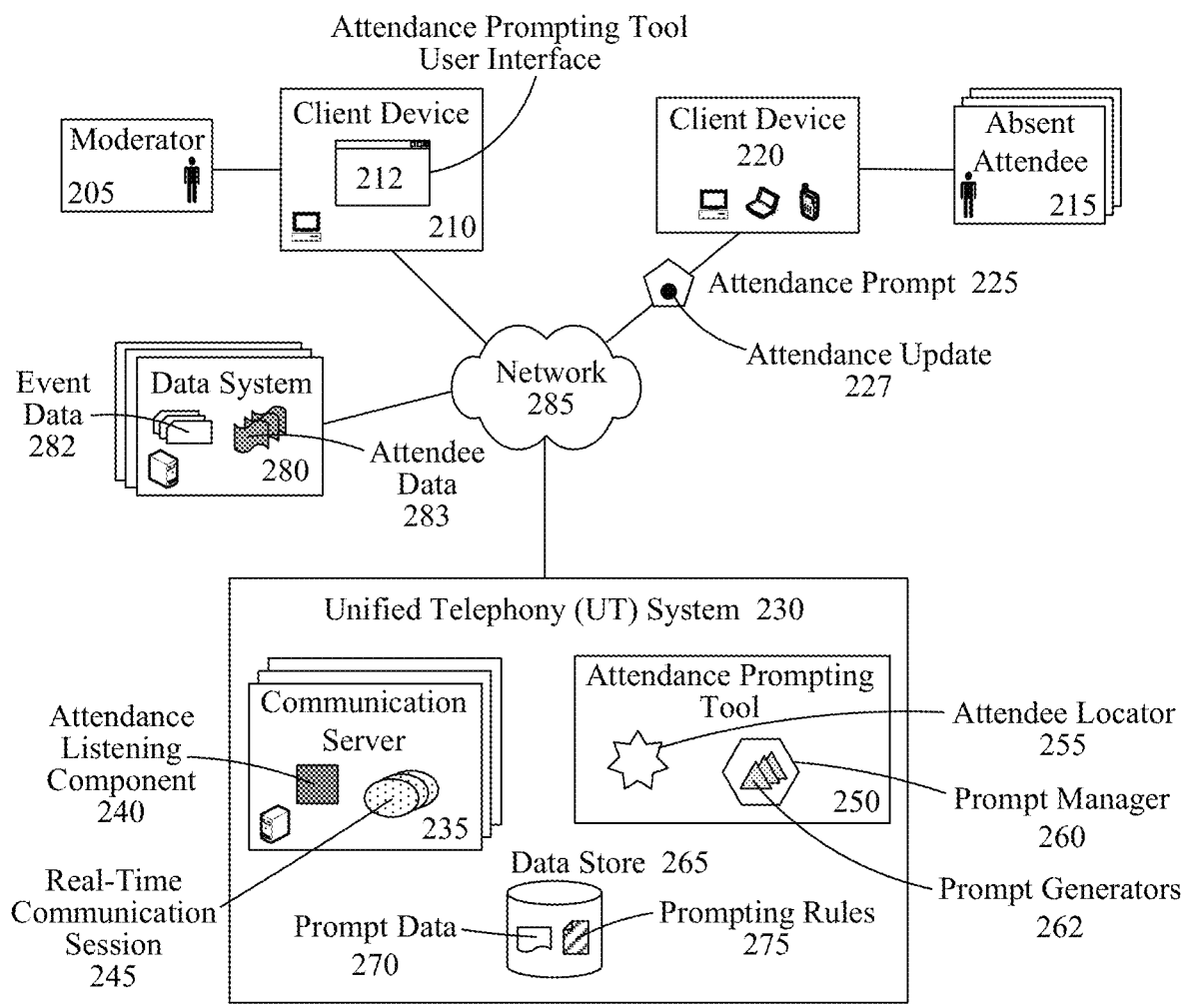
FIG. 2 is a schematic diagram illustrating a system for implementing the attendance prompting tool in accordance with an embodiment of the inventive arrangements disclosed herein.

Since the attendance prompting tool 110 is the focal point for the attendance updates 117 responses, the moderator 105 need not worry about checking multiple systems for attendance information about the attendees 120, 125, and 130. Further, the attendance prompting tool 110 can include numerous FIG. 2 is a schematic diagram illustrating a system 200 for implementing the attendance prompting tool 250 in accordance with embodiments of the inventive arrangements disclosed herein. In system 200, the moderator 205 of an electronically-scheduled event can utilize the attendance prompting tool 250 of a unified telephony system 230 to request the attendance of absent attendees 215 via network 285.

As used herein, the term "electronically-scheduled event" can be used to refer to a gathering of persons, physically and/or electronically, documented and/or managed using a software system. Information regarding the electronically-scheduled event can be stored as event data 282 by the corresponding data system 280.

The moderator 205 can represent the person who scheduled and/or initiated the electronically-scheduled event. An absent attendee 215 can represent a person invited to the electronically-scheduled event who is currently not present at the event. An absent attendee 215 may have accepted the invitation to the electronically-scheduled event or provided no response to the invitation.

The moderator 205 can interact with the attendance prompting tool 250 via a user interface 212 running on a client device 210. Client device 210 can represent a variety of computing devices capable of running the user interface 212 and communicating with the unified telephony system 230 and the client device 220 of the absent attendees 215 over the network 285.

User interface 212 can represent a graphical user interface (GUI) in which the moderator 205 can view attendance information regarding the electronically-scheduled event as well as issue attendance prompts 225 to absent attendees 215. The user interface 212 can be an interface separate from the user interface of the system used to electronically-schedule the event or can be incorporated into the interface of the scheduling system like a plug-in.

An attendance prompt 225 can represent an electronic message sent to the absent attendees 215. The attendance prompt 225 can be formatted so as to be presented upon the specific type of client device 220 of the absent attendee 215.

For example, an attendance prompt 225 being interjected into the phone call of an absent attendee 215 can be a recorded audio message, whereas the attendance prompt 225 for an instant messaging session can require only text.

The attendance prompt 225 can further include an attendance update 227 representing a feedback mechanism for the absent attendees 215 to provide a direct response to the attendance prompt 225. For example, in an online meeting user interface, the attendance update 227 can be presented as a pop-up window containing selectable responses (e.g., on my way, be there in five minutes, can't make it).

The unified telephony system 230 can represent the hardware and/or software components required to support various types of real-time communication sessions 245 (e.g., Internet-based phone calls, instant messaging sessions, online meetings, online collaboration sessions, etc.) like LOTUS SAMETIME UNIFIED TELEPHONY. The unified telephony system 230 can include communication servers 235, the attendance prompting tool 250, and a data store 265 containing prompt data 270 and prompting rules 275.

In another contemplated embodiment, the functionality provided by the unified telephony system 230 can be implemented as separate communication systems communicatively linked over the network 285. That is, system 200 would include a separate telephony system, instant messaging system, online collaboration server, and so on. In such an embodiment, the attendance prompting tool 250 would communicate and/or utilize the functionality of those systems via network 285.

The communication servers 235 can represent the hardware and/or software components that support the data exchanges for the specific type of real-time communication session 245 being performed. For example, a telephony server 235 can handle telephone communications, whereas an instant messaging server 235 would handle instant messaging communications.

Additionally, each communication server 235 can include an attendance listening component 240. The attendance listening component 240 can represent a software application installed upon the communication server 235 that allows the attendance prompting tool 250 to keep track of users participating in the real-time communication sessions 245.

Attendance listening components 240 can also be installed upon third-party computing components that provide additional communication services. Alternately, the attendance listening component 240 can be used autonomously within the unified telephony system 230 or system 200 to represent a query service specifically configured to interact with an external service-providing entity for the purpose of collecting information about the absent attendee 215.

For example, an attendance listening component 240 can exist specifically to communicate with a cell phone provider to determine if the absent attendee's 215 cell phone is in use and/or location information.

The attendance prompting tool 250 can represent a software application that automatically attempts to establish contact absent attendees 215 via the attendance prompt 225 based upon moderator 205 input and a set of prompting rules 275. The attendance prompting tool 250 can include an attendee locator 255 and a prompt manager 260.

The attendee locator 255 can represent the component of the attendance prompting tool 250 configured to locate the absent attendees 215. The attendee locator 255 can use information collected by the attendance listening components 240 and/or attendee data 283 to determine how best to contact the absent attendees 215.

By examining attendee data 285, network 285 activity and/or real-time communication sessions 245 associated with the absent attendee 215, the attendee locator 255 can approximate what the absent attendee 215 is currently doing and possibly where. The attendee data 280 can represent a variety of data (e.g., identifiers, phone numbers, calendar data, etc.) stored about the absent attendee 215 by other data systems 280, such as calendar/scheduling systems and network activity loggers.

For example, given that the absent attendee 215 is currently not logged into the network 285 and had a meeting scheduled in Bob's office prior to the scheduled event, the attendee locator 255 can determine that the absent attendee 215 is mostly in Bob's office or enroute to the event.

Such information can be important for determining where and/or how to send the attendance prompt 225 for the absent attendee 215. Using the above example, sending the attendance prompt 225 to the office phone or computer of the absent attendee 215 would be of little value since the absent attendee 215 is mostly likely not there. Thus, sending the attendance prompt 225 to the phone in Bob's office or to a mobile device belonging to the absent attendee 215 would have a higher chance of contacting the absent attendee 215.

Once the attendee locator 255 determines where/how the attendance prompt 225 should be sent, the prompt manager 260 can assume responsibility for the generation and delivery of the attendance prompt 225. The prompt manager 260 can utilize the appropriate prompt generator 262 and prompt data 270 to create the attendance prompt 225 for the target client device 220 and/or communications software application (not shown), if any, being used by the absent attendee 215 on the client device 220.

The prompt data 270 can represent text for predefined message templates and/or response options that the moderator 205 can select via the user interface 212 to comprise the attendance prompt 225. The prompt generator 262 can represent a software program configured to create the attendance prompt 225 and/or attendance update 227.

For example, in response to sending the attendance prompt 225 to a phone call, a text-to-speech generator 262 can be used to convert the message and option text to audio files. A phone tree generator 262 can then use the audio files to create a phone tree to represent the attendance prompt 225 and attendance update 227 mechanism.

Delivery of the attendance prompt 225 by the prompt manager 260 can be performed in accordance with prompting rules 275 and the communication protocols required for the determined delivery method. The prompting rules 275 can define preferences and/or business rules for delivering attendance prompts 225 to absent attendees 215.

For example, a prompting rule 275 can specify that the attendance prompt 225 should be simultaneously sent to all possible client devices 220 if the absent attendee 215 is categorized as "VP". As another example, a prompting rule 275 can indicate that, if more than one avenue of contacting the absent attendee 215 is available, contact options should be performed in order of least cost (i.e., network communications, inter-office phone calls, home phone calls, cell phone calls, text messages).

The prompting rules 275 can be defined by administrators of the unified telephony system 230 and/or moderators 205. That is, administrators can define prompting rules 275 that embody business and/or general handling rules, whereas moderators 205 can set options for prompting rules 275 as they pertain to a specific electronically-scheduled event and/or absent attendee 215.

Network 285 can include any hardware/software/and firmware necessary to convey data encoded within carrier waves. Data can be contained within analog or digital signals and conveyed though data or voice channels. Network 285 can include local components and data pathways necessary for communications to be exchanged among computing device components and between integrated device components and peripheral devices. Network 285 can also include network equipment, such as routers, data lines, hubs, and intermediary servers which together form a data network, such as the Internet. Network 285 can also include circuit-based communication components and mobile communication components, such as telephony switches, modems, cellular communication towers, and the like. Network 285 can include line based and/or wireless communication pathways.

As used herein, presented data store 265 can be a physical or virtual storage space configured to store digital information. Data store 265 can be physically implemented within any type of hardware including, but not limited to, a magnetic disk, an optical disk, a semiconductor memory, a digitally encoded plastic memory, a holographic memory, or any other recording medium. Data store 265 can be stand-alone storage units as well as a storage unit formed from a plurality of physical devices. Additionally, information can be stored within data store 265 in a variety of manners. For example, information can be stored within a database structure or can be stored within one or more files of a file storage system, where each file may or may not be indexed for information searching purposes. Further, data store 265 can utilize one or more encryption mechanisms to protect stored information from unauthorized access.

Figure 3:
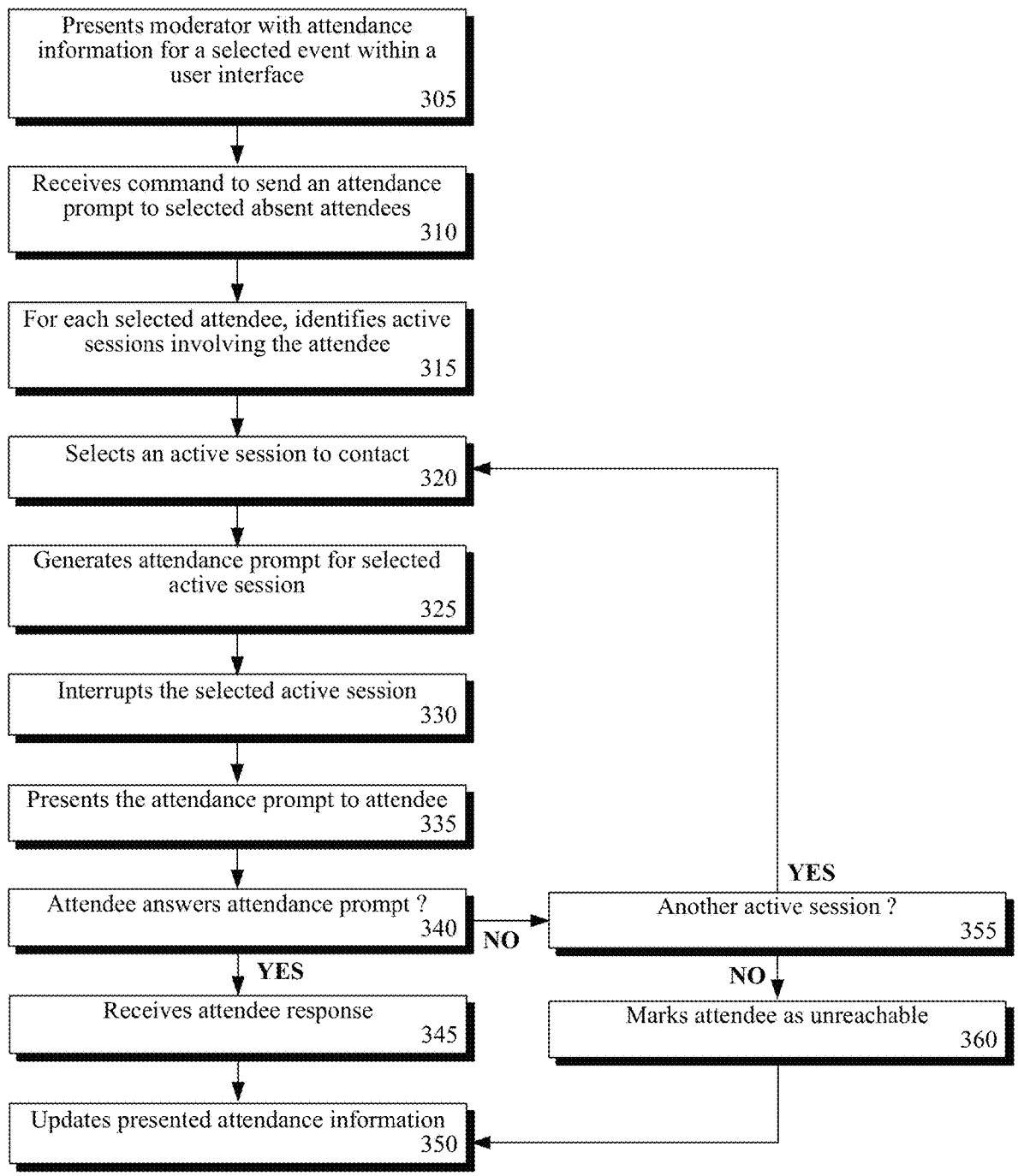
FIG. 3 is a flow chart of a method detailing an overview of the function of an attendance prompting tool in accordance with an embodiment of the inventive arrangements disclosed herein.

FIG. 3 is a flow chart of a method 300 detailing an overview of the function of an attendance prompting tool in accordance with embodiments of the inventive arrangements disclosed herein. Method 300 can be performed within the context of system 200 and/or any other communications system configured to motivate event attendance by absent attendees via an attendance prompt.

Method 300 can begin in step 305 where the attendance prompting tool can present the moderator with attendance information for the selected event in a user interface. Depending upon the specific implementation, the attendance information presented in step 305 can be limited to the presence/absence of attendees, determined automatically in the case of an electronic event session or manually via moderator input.

A command from the moderator to send an attendance prompt to selected absent attendees can be received in step 310. For each selected attendee, active sessions involving the absent attendee can be identified in step 315. The active sessions can correspond to activities being performed by the attendee that the attendance prompting tool can detect using its various attendance listening components.

In step 320, an active session can be selected to contact the absent attendee. The attendance prompt for the selected active session can be generated in step 325. In step 330, the selected active session can be interrupted. Performance of step 330 can be conducted using acceptable means in accordance with the type of session being interrupted.

Once the session is interrupted, the attendance prompt can be presented to the attendee in step 335. In step 340, it can be determined if the attendee has answered the attendance prompt via the attendance update mechanism.

If it has been determined that the attendee has not responded to the attendance prompt, such as through the use of a response timer, it can be determined if there is another active session for the attendee in step 355. If there is another active session involving the attendee, flow of method 300 can return to step 320 to repeat steps for sending the attendance prompt to the other active session.

If the attendee is not involved in another active session, step 360 can execute where the attendee can be marked as unreachable or out of contact. From step 360, the presented attendance information can be updated to reflect the "unreachable" assignation in step 350.

If the attendee answers the attendance prompt, the attendance prompting tool can received the attendee's response in step 345. The attendee's response can then be used in step 350 to update the presented attendance information.

Figure 4:
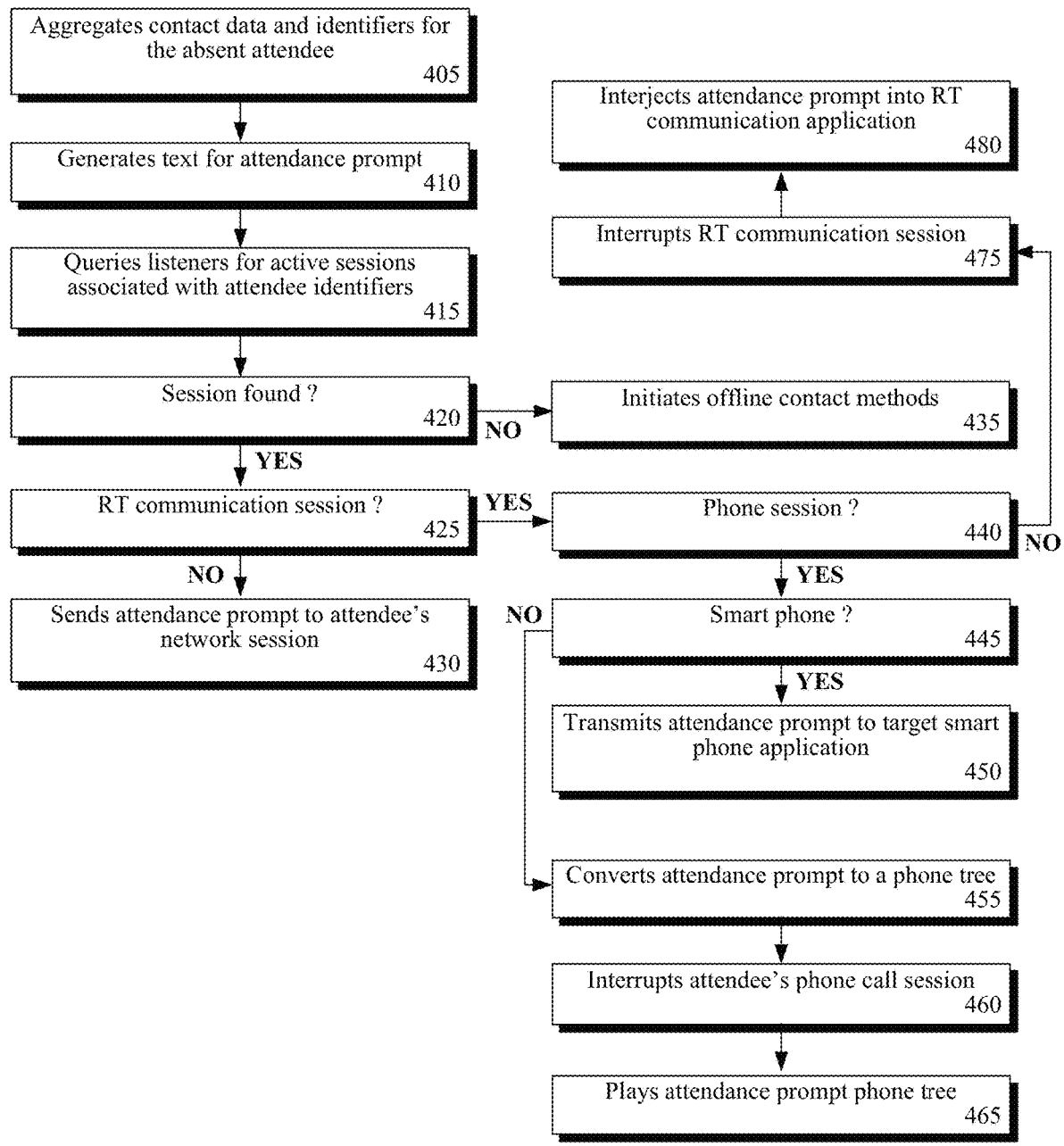
FIG. 4 is a flow chart of a method illustrating the delivery of the attendance prompt to an absent attendee by the attendance prompting tool in accordance with embodiments of the inventive arrangements disclosed herein.

FIG. 4 is a flow chart of a method 400 illustrating the delivery of the attendance prompt to an absent attendee by the attendance prompting tool in accordance with embodiments of the inventive arrangements disclosed herein. Method 400 can be performed within the context of system 200 and/or method 300.

Method 400 can begin in step 405 where the attendance prompting tool can aggregate contact data (e.g., phone numbers) and identifiers (e.g., email address, username, instant messaging handle) for the absent attendee. The text for the attendance prompt can be generated in step 410.

In step 415, the attendance listening components can be queried to find active sessions that are associated with the attendee's identifiers. The existence of an active session involving the absent attendee can be determined in step 420.

If no active sessions are found for the absent attendee, method 400 can flow to step 435 where the attendance prompting tool can initiate offline contact methods for the absent attendee. For example, the attendance prompting tool can take steps to initiate, not interrupt, a communication session with the absent attendee.

If an active session involving the absent attendee is found, it can be determined if the session is a real-time communication session in step 425. If the session is not a real-time communication session, step 430 can execute where the attendance prompt can be sent to the attendee's network session.

Performance of step 430 can utilize additional software tools such as WinSent MESSANGER or inherent system functions like the "net send" command. However, it should be noted that the means utilized to perform step 430 can vary depending upon the implementation of the unified telephony system and/or overall system.

If the active session is determined to be a real-time communication session, flow of method 400 can proceed to step 440 where it can be determined if the real-time communication session is a phone session. If the real-time communication session is determined to not be a phone session, and, therefore, is some other type of real-time communication session (e.g., instant messaging, online collaboration, Web meeting, etc.), the real-time communication session can be interrupted using appropriate means in step 475.

In step 480, the attendance prompt can be interjected into the real-time communication application. For example, if the absent attendee is in an instant messaging session, the attendance prompt can be presented to the attendee within the session's window.

If the real-time communication session is determined to be a phone session, it can be determined if a smart phone is being used in step 445. If a smart phone is being used for the phone session, step 450 can execute where the attendance prompt can be transmitted to a target smart phone application for presentation to the attendee. The smart phone application can then be responsible for interrupting the phone session and presenting the attendance prompt to the attendee.

If a smart phone is not being used (e.g., a phone for a land line, a generic cell phone, a softphone, etc.), the attendance prompt can be converted to a phone tree in step 455. In step 460, the attendee's phone call session can then be interrupted. Then, the attendance prompt phone tree can be played to the attendee in step 465.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method within an attendance prompting tool executing on a client device, comprising:

automatically determining, using the attendance prompting tool, an absence of an attendee of an electronic event session at a scheduled time of the electronic event session;

identifying, using a listening component capable of being queried by the attendance prompting tool and for the previously-determined absent attendee, an active session involving the absent attendee; and automatically contacting the attendee by sending, to an electronic device associated with the attendee using the attendance prompting tool and based upon the identified active session involving the attendee, a message including an attendance prompt, wherein the message is configured to interrupt the active session and cause the electronic device to present the attendance prompt to the attendee, and the active session is a real-time communication session.

2. The method of claim 1, wherein the listening component is a software application installed upon a communication server that tracks users participating in real-time communication sessions.

3. The method of claim 1, further comprising:

receiving, by the attendance prompting tool from the electronic device and based upon the attendance prompt, an attendee response.

4. The method of claim 3, wherein
the attendance prompt is configured to provide, to the electronic device and as selectable options for the attendee response, a plurality of attendee responses.

5. The method of claim 3, further comprising:
sending a second message to the electronic device upon the attendee response not being received from the electronic device.

6. The method of claim 5, wherein
the second message identifies a second active session associated with the attendee, and
the second message is configured to interrupt the second active session.

7. The method of claim 1, wherein
the message identifies the active session.

8. The method of claim 1, further comprising:
marking, based upon no additional active session associated with the attendee being identified, the attendee as unreachable.

9. A client computer device including an attendance prompting tool, comprising:
a hardware processor configured to perform:
automatically determining, using the attendance prompting tool, an absence of an attendee of an electronic event session at a scheduled time of the electronic event session;
identifying, using a listening component capable of being queried by the attendance prompting tool and for the previously-determined absent attendee, an active session involving the absent attendee; and
automatically contacting the attendee by sending, to an electronic device associated with the attendee using the attendance prompting tool and based upon the identified active session involving the attendee, a message including an attendance prompt, wherein
the message is configured to interrupt the active session and cause the electronic device to present the attendance prompt to the attendee, and
the active session is a real-time communication session.

10. The client computer device of claim 9, wherein
the listening component is a software application installed upon a communication server that tracks users participating in real-time communication sessions.

11. The client computer device of claim 9, wherein the hardware processor is further configured to perform:
receiving, by the attendance prompting tool from the electronic device and based upon the attendance prompt, an attendee response.

12. The client computer device of claim 11, wherein
the attendance prompt is configured to provide, to the electronic device and as selectable options for the attendee response, a plurality of attendee responses.

13. The client computer device of claim 11, wherein the hardware processor is further configured to perform:
sending a second message to the electronic device upon the attendee response not being received from the electronic device.

14. The client computer device of claim 13, wherein
the second message identifies a second active session associated with the attendee, and
the second message is configured to interrupt the second active session.

15. The client computer device of claim 9, wherein
the message identifies the active session.

16. The client computer device of claim 9, further comprising:
marking, based upon no additional active session associated with the attendee being identified, the attendee as unreachable.

17. A computer program product, comprising:
a hardware storage device having stored therein computer usable code,
the computer usable code, which when executed by a client computer device including an attendance prompting tool, causes the client computer device to perform:
automatically determining, using the attendance prompting tool, an absence of an attendee of an electronic event session at a scheduled time of the electronic event session;
identifying, using a listening component capable of being queried by the attendance prompting tool and for the previously-determined absent attendee, an active session involving the absent attendee; and
automatically contacting the attendee by sending, to an electronic device associated with the attendee using the attendance prompting tool and based upon the identified active session involving the attendee, a message including an attendance prompt, wherein
the message is configured to interrupt the active session and cause the electronic device to present the attendance prompt to the attendee, and
the active session is a real-time communication session.

18. The computer program product of claim 17, wherein
the listening component is a software application installed upon a communication server that tracks users participating in real-time communication sessions.

19. The computer program product of claim 17, wherein the computer usable code further causes the client computer device to perform:
receiving, by the attendance prompting tool from the electronic device and based upon the attendance prompt, an attendee response.

20. The computer program product of claim 19, wherein
the attendance prompt is configured to provide, to the electronic device and as selectable options for the attendee response, a plurality of attendee responses.

21. The computer program product of claim 19, wherein the computer usable code further causes the client computer device to perform:
sending a second message to the electronic device upon the attendee response not being received from the electronic device.

22. The computer program product of claim 21, wherein
the second message identifies a second active session associated with the attendee, and
the second message is configured to interrupt the second active session.

23. The computer program product of claim 17, wherein
the message identifies the active session.

24. The computer program product of claim 17, further comprising:
marking, based upon no additional active session associated with the attendee being identified, the attendee as unreachable.

* * * * *